July 25, 1967 JEAN-PIERRE VASSEUR ETAL 3,333,212

OSCILLATOR DEVICE OPERATED BY LIGHT

Filed May 6, 1964 2 Sheets-Sheet 1

Inventors
Jean-Pierre Vasseur
Jacques Riethmuller
By Cushman, Darby & Cushman
Attorneys Inventors
Jean-Pierre Vasseur
Jacques Riethmuller
By Cushman, Darby & Cushman
Attorneys 3,333,212
Patented July 25, 1967

3,333,212

OSCILLATOR DEVICE OPERATED BY LIGHT

Jean-Pierre Vasseur and Jacques Riethmuller, Paris, France, assignors to CSF—Compagnie Generale de Telegraphie Sans Fil, Paris, France, a corporation of France Filed May 6, 1964, Ser. No. 365,439
Claims priority, application France, May 13, 1963, 934,579
2 Claims. (Cl. 331—107)

The present invention relates to an oscillator of a new type. More particularly, the invention provides an oscillator comprising a light emissive semiconductor, which emits light through carrier recombination, associated with a photodiode, through one or more reactive elements or delay devices, and one or more power sources.

It is well known that, in order that self sustaining oscillations may exist, a power gain, and a coupling with an adequate phase relationship between the input and the output, or a negative resistance, are necessary.

In an oscillator according to the invention, a more or less important part of the light, emitted through carrier recombinations by the light emissive element, is passed to a photodiode which thus generates current.

Even if all the photons emitted by the light emissive element are assumed to reach the photodiode, and even if the quantum efficiency is equal to unity, in so far as both the emission and the absorption of light are concerned, the current of the photodiode is at most equal to the current fed to the light emissive element and there will be no gain.

However a high power gain can be obtained with the above outlined arrangement because of an "impedance gain" similar to the gain which appears in transistors.

Current is fed to the light emissive element at a low voltage because of its being fed to a forward biased junction, while the current collected at the photodiode terminals, is collected at the terminals of a reverse biased junction, and is therefore being collected at a much higher voltage.

The invention will be better understood from the following specifications and appended drawing in which.

The same reference numbers have been used throughout all the figures to designate the same elements.

Figure 1:
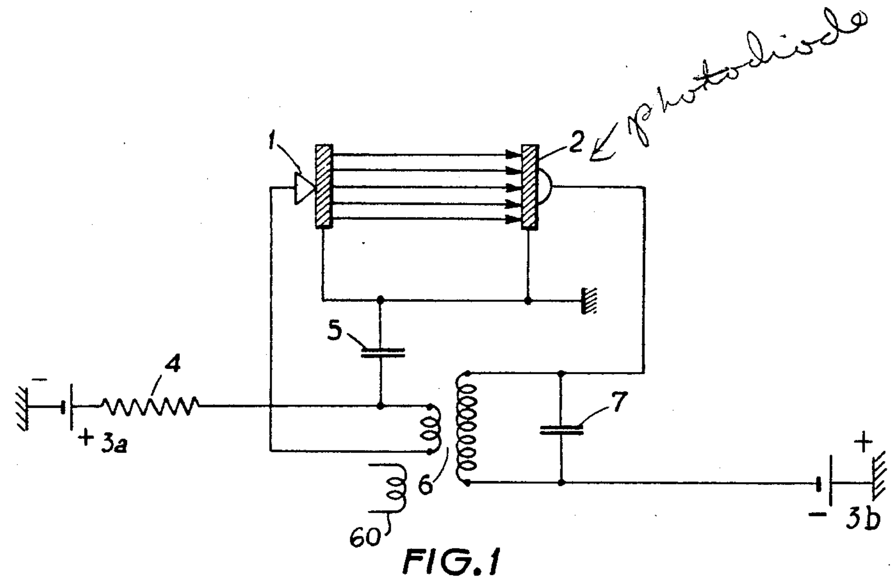
FIG. 1 shows an oscillator according to the invention, in which the feedback loop comprises a tuned transformer.

The oscillator assembly illustrated in FIG. 1 comprises basically a light emissive element 1, which is optically coupled to a photodiode 2. Such elements have been described, for example, in the Journal of Applied Physics, January 1963, page 178.

Element 1 is fed by D.C. supply 3_a_ through a resistor 4, while photodiode 2 is being fed by a D.C. voltage supply 3_b_. Supplies 3_a_ and 3_b_ are grounded as shown in the figure. The coupling between element 1 and diode 2 is accomplished by a transformer 6, whose primary winding is tuned by means of a capacitor 7. A decoupling capacitor 5 is also provided.

Element 1 emits light, which light is collected by photodiode 2. The current generated by diode 2 is fed back to the element 1 through the coupling transformer 6, thus causing oscillations to appear in the system. Transformer 6 comprises a secondary 60 delivering the output signal.

Figure 2:
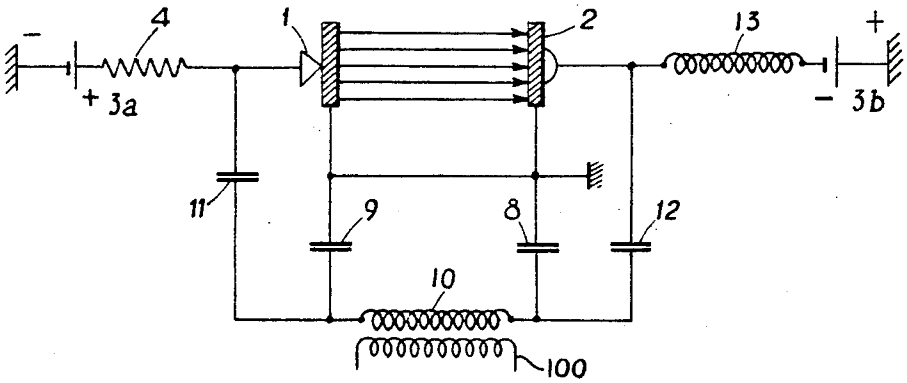
FIG. 2 shows a further embodiment in which the feedback network comprises an impedance matching $\pi$ filter.

In the arrangement of FIG. 2, the coupling between photodiode 2 and element 1 is through a $\pi$ network including two capacitors 8 and 9 and an inductance coil 10. A coil 100, coupled to coil 10, delivers the output signal. Decoupling capacitors 11 and 12 and a choke coil 13 are also provided.

The arrangement of FIG. 2 operates in the same manner as that of FIG. 1.

Figure 3:
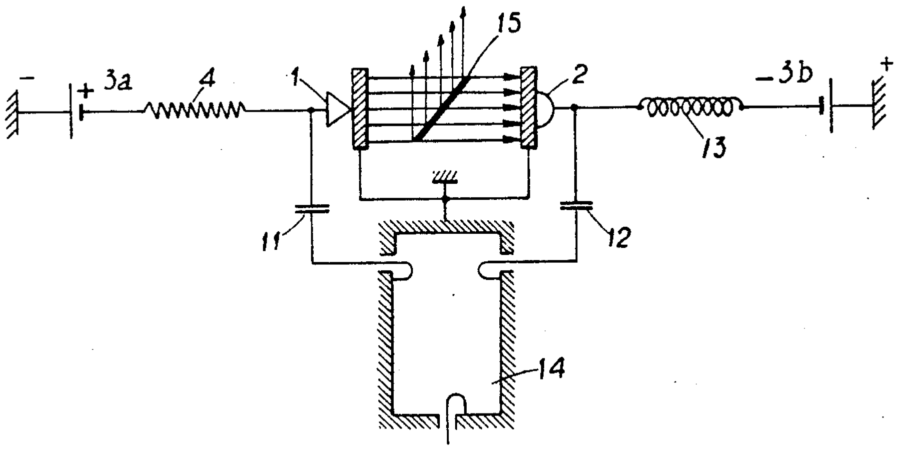
FIG. 3 shows a still further embodiment, in which the feedback network comprises a resonant cavity.

In the embodiment of FIG. 3 the coupling between photodiode 2 and element 1, is obtained by means of a cavity resonator 14, this arrangement being intended for microwaves. Furthermore, in the embodiment of FIG. 3, a semitransparent plate 15, is inserted between element 1 and diode 2 to collect a part of the modulated luminous energy passing from element 1 to diode 2. This part of modulated luminous energy can be used as an output energy of the oscillator, and can be detected by another photodiode. If this part is sufficiently low, i.e., if the plate is sufficiently transparent, the part of the light collected by the photodiode remains sufficient for sustaining the oscillations.

Figure 4:
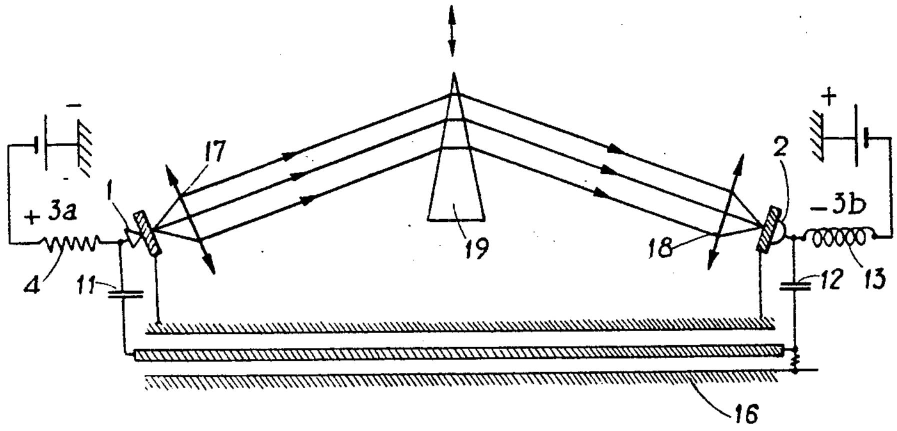
FIG. 4 shows an oscillator according to the invention comprising a delay device in the shape of an optical system, which couples the light emissive element to the photodiode, and a coaxial line which also serves as matching elements.

The arrangement shown in FIG. 4 is also intended to be used with microwaves.

The coupling between diode 2 and element 1 is through a coaxial line 16, or alternatively through a wave guide. An optical delaying means comprising two convergent lenses 17 and 18, and a prism 19 has been inserted in the path from element 1 to photodiode 2. The oscillation frequency of the arrangement can be adjusted by displacing prism 19 vertically, in the direction of the arrow, which results in a variation of the beam optical path, thereby causing the loop phaseshift to vary. This phaseshift is far from being negligible. For example, at 1000 mc., the light travels through 15 cm. during each half cycle. The optical path between element 1 and photodiode 2 should be 15 cm.; a phaseshift by $\pi$ is caused by this path.

Many other modifications could be devised within the framework of said invention.

One of the attractive features of this new oscillator lies in the fact that some light emissive elements exist, for example those comprising gallium arsenide, or compounds of elements belonging to groups III or V of the Mendéleev classification, which are capable of emitting infra-red light modulated at say 1000 mc., with an input power of several watts and a high gain. Some photoconductors, for example suitably doped germanium or silicon, can be used for photodiodes responsive to light energy in the above mentioned frequency band.

It is to be noted that the above described circuits can of course be operated as amplifiers instead of being operated as oscillators. In this case there will be, of course, no feedback between circuits 1 and 2 and the amplified energy is collected at the output of the latter.

Of course, the invention is not limited to the embodiments described and shown which were given solely by way of example.

What is claimed is:

1. An oscillator system comprising a solid state light emissive element made of a compound of elements belonging to groups III and V of the Mendéleev classification, having an input for receiving electrical energy, for emitting light; a photodiode, made of a doped semiconductor for receiving said light, having an output; feedback loop passive circuit means coupling said output to said input;

and optical delay means positioned in the path of the light between said element and said photocell.

2. An oscillator system comprising a solid state light emissive element made of a compound of elements belonging to groups III and V of the Mendéleev classification, having an input for receiving electrical energy, for emitting light; a photodiode, made of a doped semiconductor for receiving said light, having an output; feedback loop passive circuit means coupling said output to said input, and a prism positioned in the path of the light between said element and said photocell.

References Cited

UNITED STATES PATENTS

| | | | |
|---|---|---|---|
| 1,958,986 | 5/1934 | Culver | 331—66 X |
| 2,975,290 | 3/1961 | Spitzer | 331—107 X |
| 3,033,988 | 5/1962 | Edgerton. | |
| 3,111,587 | 11/1963 | Rocard | 332—3 X |

OTHER REFERENCES

Henisch: Electroluminescence, The MacMillan Co., New York, 1962, pages 29–31.

Baird et al.: "GaAs Infrared Source for Optoelectronic Applications," 1963 International Solid State Circuits Conference Digest of Technical Papers, Feb. 22, 1963, pages 108, 109.

Gelleo et al.: "Optical Coupling: New Approach to Micro-Circuit Interconnections," Electronics, vol. 36, No. 47, Nov. 22, 1963, pages 23–27.

Special Products Technical Note #6 of Philco Lansdale Division, "Solid-State Light Emitting Diode Philco GAE–402," November 1962.

ROY LAKE, *Primary Examiner.*

NATHAN KAUFMAN, *Examiner.*

J. B. MULLINS, *Assistant Examiner.*